United States Patent Office 3,663,506
Patented May 16, 1972

---

3,663,506
STABILIZATION OF URETHANE POLYMERS WITH SUBSTITUTED UREAS
Robert John Knopf, St. Albans, Lloyd Marshall Bowne, Nitro, and Robert Darrell Hiser, Charleston, W. Va., assignors to Union Carbide Corporation, New York, N.Y.
No Drawing. Filed Nov. 18, 1970, Ser. No. 90,871
Int. Cl. C08g *17/58*
U.S. Cl. 260—45.85                  9 Claims

ABSTRACT OF THE DISCLOSURE

Urethane polymers are stabilized against discoloration by certain substituted ureas, some of which are novel. The invention is particularly useful for stabilizing spandex fibers, urethane films, foams, and the like, against discoloration.

---

The invention relates to substituted ureas and the use of substituted ureas in the stabilization of urethane polymers against discoloration.

Urethane polymers are subject to discoloration upon exposure to atmospheric fumes (gas fade), ultraviolet light, oxidizing agents such as chlorine bleach, and the like. The prior art has proposed various methods for stabilizing against this discoloration. For instance, in U.S. Pat. No. 3,095,322, benzanilide is used in elastic polyurethane fibers to stabilize against discoloration from atmospheric fumes such as nitrogen oxides. In U.S. Pat. No. 3,352,822, phenylthioureas and acid anhydrides are used in combination in urethane elastomers to stabilize against discoloration from gas fade and ultraviolet light. Other known agents for stabilizing urethane polymers against various types of discoloration include an antioxidant plus a substituted urea containing a cyano group (French Pat. No. 1,546,717), various sulfides (U.S. Pat. No. 3,428,578), and certain bis-oxalic acid diamides (Belgian Pat. No. 713,512).

The present invention is based upon the discovery that certain substituted ureas (many of which are novel), fully described below, are effective agents for stabilizing urethane polymers against discoloration caused by various factors such as ultraviolet light, atmospheric fumes, oxidizing agents such as chlorine bleach, and the like.

Accordingly, it is an object of this invention to provide a method for stabilizing urethane polymers against discoloration.

Another object of the invention is to provide color-stabilized urethane polymers.

An additional object of the invention is to provide color-stabilized urethane polymers containing certain substituted ureas.

A further object of the invention is to provide color-stabilized polyurethane elastomers, particularly, elastic fibers.

A still further object of the invention is to provide certain novel substituted ureas.

Additional objects of the invention will be apparent from the accompanying specification.

Broadly, the invention provides certain substituted ureas and urethane polymers stabilized against discoloration by the addition of substituted ureas. The urethane polymers that are stabilized in accordance with the invention are known in the art. They include flexible and rigid urethane foams, non-foamed elastomers, elastic fibers, films, coatings, and the like.

Urethane polymers are conventionally produced by reacting a relatively high molecular weight polyhydric alcohol (e.g., having a molecular weight of from about 500 to about 5000) with an organic polyisocyanate. Other reactants that can be present include water, polyamines (usually diamines), hydrazine, and other compositions that are reactive with isocyanate. Alternative methods for producing urethane polymers include the reaction of chloroformate esters of polyols with polyamines.

The textbook "Polyurethanes: Chemistry and Technology," by Saunders and Frisch, Interscience Publishers, New York (Part I—"Chemistry," published in 1962 and Part II—"Technology," published in 1964) describes the preparation of urethane polymers useful in this invention. In particular, Part II contains sections on the preparation of flexible foams, rigid foams, elastomers, coatings, and fibers.

The preparation of color-stabilized elastic urethane fibers constitutes a preferred aspect of this invention. In addition to the Saunders and Frisch text mentioned above, the preparation of elastic urethane fibers is described in, for instance, Steuber, U.S. Pat. No. 2,929,804 (reaction product of polyalkylene ether glycol—especially polytetramethylene oxide glycol—organic diisocyanate, and diamine); Schilit, U.S. Pat. No. 3,097,192 (reaction product of a polyester of a dihydric alcohol and a dicarboxylic acid, organic diisocyanate, and diamine); and Horn and Magnus, U.S. Pat. No. 3,509,102 (reaction product of a polylactone, an organic diisocyanate, and a difunctional curing agent such as a diamine).

The urethane polymers that are preferably employed in the invention are those wherein the urethane moieties in the polymeric structure contain an aryl group bonded directly to nitrogen. Such urethanes are derived, for instance, from aromatic isocyanates.

The stabilizers that are employed in the invention are substituted ureas. Among the substituted ureas are those that can be prepared by reacting bis(2-isocyanatoethyl) fumarate, bis(1-methyl-2-isocyanatoethyl) fumarate, or an alkylene diisocyanate with certain primary aryl amines or aralkyl amines. Such ureas can be represented by the formula:

(I)            R¹(NH—CO—NH—R²)₂ 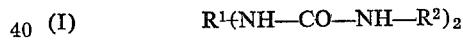

wherein R¹ represents an alkylene or cycloalkylene group having from 6 to 24 carbon atoms, a di(ethylene) fumarate group, or a di(1-methylethylene) fumarate group, and wherein R² represents chlorophenyl, methoxyphenyl, methylphenyl, benzyl, 2-bromophenyl, 2-chlorobenzyl, 3,4-dichlorophenyl, or 2,4,5-trichlorophenyl.

A second class of substituted ureas that can be employed in the invention include those that can be produced by reacting an alkyl monoisocyanate with a primary aryl or aralkyl amine. These substituted ureas can be represented by the formula:

(II)           R³—NH—CO—NH—R² wherein R² is as defined above with respect to Formula I, and wherein R³ represents an alkyl group having from 12 to 24 carbon atoms.

The novel substituted ureas that are provided by the invention can be represented by the following formula:

(III)          R⁴(NH—CO—NH—R⁵)₂ 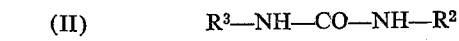

wherein R⁴ represents the di(ethylene) fumarate group, i.e., the group having the formula —CH₂CH₂—O—CO—CH=CH—CO—O—CH₂CH₂— 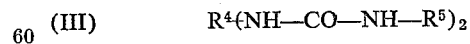

and wherein R⁵ represents chlorophenyl, methoxyphenyl, 2-bromophenyl, 3,4-dichlorophenyl, 2,4,5-trichlorophenyl, benzyl, or 2-chlorobenzyl.

The substituted ureas of Formulas I, II and III are produced by reacting an organic isocyanate with a primary amine. Among the isocyanates that can be used for this purpose are bis(2-isocyanatoethyl) fumarate (referred to as FDI), bis(2-isocyanato-1-methylethyl) fu- 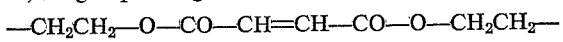

marate, 1,6-hexamethylene diisocyanate, 1,8-octamethylene diisocyanate, 1,10-diisocyanatodecane, 1,12-diisocyanatododecane, 1,18-diisocyanatooctadecane, 1,4-cyclohexylene diisocyanate, 2-methyl-1,5-cyclohexylene diisocyanate, 2-methyl-1,3-cyclohexylene diisocyanate dodecyl isocyanate, octadecyl isocyanate, eicosyl isocyanate, and the like. The preferred isocyanate is bis(2-isocyanatoethyl) fumarate.

Among the primary amines that can be reacted with the above-exemplified isocyanates to form the substituted ureas of the invention are 2-chloroaniline, 3-chloroaniline, 4-chloroaniline, 2-methoxyaniline, ortho-toluidine, 2-bromoaniline, 3,4-dichloroaniline, 2,4,5-trichloroaniline, benzylamine, 2-chlorobenzylamine, and the like. The preferred primary amines are chloroanilines.

Among the substituted ureas that are within Formulas I, II, and III, specific representative examples include:

bis[2-(4-chlorophenylureylene)ethyl] fumarate;
bis[1-methyl-2-(2-chlorophenylureylene)ethyl] fumarate;
bis[2-(2-chlorophenylureylene)ethyl] fumarate;
1,3-bis(2-chlorophenylureylene)cyclohexane;
2-methyl-1,5-bis(2-chlorophenylureylene)cyclohexane;
1,12-bis(2-chlorobenzylureylene)dodecane;
1-(2-chlorophenyl)-3-eicosylurea;

and others such as those specifically mentioned below in the examples.

The substituted ureas of the invention can be prepared by the known type reaction of an isocyanate with a primary amine. Essentially stoichiometric proportions of the reactants are preferably employed. For instance, in preparing a substituted urea that is within the scope of Formula I, two moles of amine are employed per mole of diisocyanate. The substituted ureas of Formula II can be prepared by reacting one mole of amine per mole of monoisocyanate. In general, it is desirable to carry out the reaction by adding the amine to a solution of the isocyanate in a reaction medium that is a solvent for the reactants but not for the substituted urea product. Such reaction mediums include benzene, toluene, xylene, nonane, N,N-dimethylformamide, dioxane, "Cellosolve" acetate, and mixtures thereof. The hydrocarbons are preferred, especially these whose boiling points are not over about 110° C.

The reaction can be carried out at a temperature that can vary over a relatively wide range, for instance, from about 25° to about 100° C. (The reaction takes place above 100° C., but side reactions can occur in some cases at higher temperatures.) The production of substituted urea begins as soon as the reactants are mixed, as will be indicated by precipitation of the product. Normally, the reaction is complete within about 2 to about 5 hours, although reaction times as high as 120 hours are required in some cases.

The substituted urea product can be recovered from the reaction mixture by filtration. It can be purified by recrystallization from a convenient solvent such as acetone, a mixture of ethanol and N,N-dimethylformamide, or other relatively low boiling (e.g., below about 110°–150° C.) polar solvent.

It is, of course, preferred to carry out the reaction under essentially anhydrous conditions in order to avoid undesired side reactions. It is also preferred to carry out the reaction under an inert atmosphere such as nitrogen, helium, argon, or the like.

The substituted urea can be added to the urethane polymer in any convenient manner. For instance, in preparing foams, elastomers, and the like, it is desirable to add the substituted urea to the polyol prior to reacting with the isocyanate. In preparing cast films, elastic fibers, coatings and the like, it is desirable to add the substituted urea to the polymer solutions prior to casting the film, spinning the fiber, applying the coating, or the like.

The substituted urea is employed in an amount sufficient to retard discoloration of the urethane polymer from one or more causes such as light (principally ultraviolet light), atmospheric fumes such as oxides of nitrogen, oxidizing agents such as chlorine bleach (i.e., hypochlorites, and the like), and the like. Effective concentrations of substituted ureas can vary, for instance, from about 1 to about 10, and preferably from about 2.5 to about 5 weight percent, based on weight of urethane polymer.

The color stabilizing effects of the substituted ureas are enhanced in some cases by the use of other additives such as delusterants (e.g., titanium dioxide), ultraviolet absorbers, and antioxidants.

The examples below illustrate certain aspects of the invention.

EXAMPLE 1

Preparation of substituted urea of Formulas I and III

A solution of 4-chloroaniline (52.0 g.; 0.408 mole) in benzene (200 ml.) was added at one time to a solution of bis(2-isocyanatoethyl) fumarate (FDI) (52.0 gms.; 0.20 mole) in benzene (500 ml.) in a 2-liter flask equipped with a stirrer, thermometer, condenser, and nitrogen induction tube. The stirred solution was then heated to 75° C. and maintained at this temperature for three hours. Solid bis[2-(4-chlorophenylureylene)ethyl] fumarate started precipitating almost immediately and continued precipitating throughout the reaction period. The course of the reaction was followed by infrared to the disappearance of the band at 4.4μ that is characteristic for isocyanates.

The reaction mixture was cooled to 10° C. and the solid product was isolated by filtration. After drying in air, the crude product weighed 99.9 grams which corresponds to a yield and efficiency of 98 percent based on FDI. After recrystallization from mixed ethanol/dimethylformamide (62.5/37.5 volume percent) the product melted wtih decomposition at 227°–229° C. (not corrected). Elemental analyses confirmed the identity of the substituted urea.

Calculated (percent): C, 51.88; H, 4.36; N, 11.00; Cl, 13.92. Found (percent): C, 51.87; H, 4.41; N, 10.93; Cl, 14.14.

EXAMPLES 2–11

The following substituted ureas were prepared in a manner analogous to that described in Example 1 from the indicated isocyanates and amines. The identity of each product was confirmed by elemental analyses, which were in good agreement with the theoretical.

(2) Bis[2-(2-chlorophenylureylene)ethyl] fumarate from FDI and 2-chloroaniline.

(3) 1,6-bis(2-chlorophenylureylene)hexane from 1,6-hexamethylene diisocyanate and 2-chloroaniline.

(4) Bis[2-(3-chlorophenylureylene)ethyl] fumarate from FDI and 3-chloroaniline.

(5) Bis[2-(2-methoxyphenylureylene)ethyl] fumarate from FDI and 2-methoxyaniline.

(6) Bis[2-(2-methylphenylureylene)ethyl] fumarate from FDI and 2-methylaniline.

(7) Bis[2-(2-bromophenylureylene)ethyl] fumarate from FDI and 2-bromoaniline.

(8) Bis[2-(3,4-dichlorophenylureylene)ethyl]fumarate from FDI and 3,4-dichloroaniline.

(9) Bis[2-(benzylureylene)ethyl] fumarate from FDI and benzylamine.

(10) Bis[2-(2,4,5-trichlorophenylureylene)ethyl] fumarate from FDI and 2,4,5-trichloroaniline.

(11) Bis[2-chlorobenzylureylene)ethyl] fumarate from FDI and 2-chlorobenzylamine.

EXAMPLE 12

Preparation of substituted urea of Formula II

A solution of 4-chloroaniline (14.0 g., 0.11 mole) in benzene (100 ml.) was added at one time to a solution of octadecyl isocyanate (29.6 g.; 0.11 mole) in benzene (100 ml.) in a 500 ml. flask equipped with stirrer, thermometer, condenser, and nitrogen induction tube. The stirred solution was then heated to 75° C. and maintained at this temperature for a total of three hours. Solid 1-octadecyl-3-(4-chlorophenyl)urea started precipitating almost immediately and continued throughout the reaction period. The course of the reaction was followed by infrared to the disappearance of the band at 4.4µ that is characteristic for isocyanates.

The reaction mixture was cooled to 20° C. and the solid product was isolated by filtration. After drying in air, the crude product weighed 39.8 grams, which corresponds to a yield and efficiency of 94 percent based on octadecyl isocyanate. After recrystallization from acetone, the 1-octadecyl-3-(4-chlorophenyl)urea melted at 129°–130° C. (not corrected). Elemental analyses confirmed the identity of the urea.

Calculated (percent): C, 70.97; H, 10.24; N, 6.62; Cl, 8.38. Found (percent): C, 71.13; H, 10.31, N, 6.69; Cl, 8.73.

EXAMPLE 13

In a manner analogous to that described in Example 12, 1-octadecyl - 3 - (2-chlorobenzyl)urea was prepared from octadecyl isocyanate and 2-chlorobenzyl amine. The purified urea melted at 98°–99° C., its identity was confirmed by elemental analyses.

Evaluation of substituted ureas as color stabilizers

In evaluating the color stabilization effect of the substituted ureas of the invention, three standard testing procedures were employed. The testing procedures, which have been standardized by the AATCC (American Association of Textile Chemists and Colorists), were:

AATCC 23–1962 (gas fade).
AATCC 3–1962 (chlorine bleach).
AATCC 16A–1964 (Fade Index). (Fade Index measures color change upon exposure to ultraviolet light.)

In reporting the results of these evaluations, the lower the number, the better the performance in the test.

EXAMPLE 14

An elastic urethane polymer was prepared in accordance with the method of Example 1 of U.S. Pat. No. 3,509,102, with the exception that about 4.3 mole percent of water (based on NCO content) was reacted with the prepolymer prior to reaction with ethylenediamine. Prior to spinning the fiber, 0.5 weight percent titanium dioxide, 1.5 weight percent "Tinuvin 327,"[1] and 0.5 weight percent "AO-431"[2] (percentages being based on polymer weight), were added to the solution of polymer in N,N-dimethylformamide (DMF).

To respective portions of the polymer, bis[2-(2-chlorobenzylureylene)ethyl] fumarate and bis[2-(2-chlorophenylureylene)ethyl] fumarate (cf. Examples 11 and 2) were incorporated in a concentration of five weight percent, based on polymer total solids. The samples, along with a control sample without any urea additive, were wet-spun into DMF/water to give fibers with the following properties:

| Stabilizer | Urea stabilizer conc. (percent) | Gas fade (total change) | Fade index (change/hr.) | Chlorine bleach (total change) |
|---|---|---|---|---|
| Control (no urea additive) | | 17.1 | 0.34 | 24.2 |
| Bis[2-(2-chlorobenzylureylene)-ethyl] fumarate | 5.0 | 12.0 | 0.33 | 14.8 |
| Bis[2-(2-chlorophenylureylene)-ethyl] fumarate | 5.0 | 13.8 | 0.26 | 17.9 |

[1] "Tinuvin 327" is a compound of the formula:

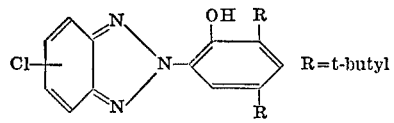

R=t-butyl

[2] "AO-431" is 2,6-bis(1-phenethyl)-4-methylphenol.

It is obvious from the values obtained that the use of these substituted ureas offer substantial improvement in color stability of the elastic urethane fiber.

EXAMPLE 15

An elastic urethane fiber was prepared in accordance with the general procedure of U.S. Pat. No. 3,509,102 from the following components:

The lactone diol was a 40/60 (weight) mixture of a 1250 MW poly(epsilon-caprolactone) (initiated with diethylene glycol) and the reaction product of 1 mole of tolylene diisocyanate with 2 moles of the same poly(epsilon-caprolactone);

The lactone diol was reacted with bis(4-isocyanatophenyl)methane (MDI) in an NCO/OH molar ratio of 1.8 in DMF to form a 50 weight percent solution in DMF;

The prepolymer was then reacted with an essentially stoichiometric amount of a 0.96/0.04 (molar) mixture of extender/terminator. The extender was a 75/25 (weight) mixture of ethylenediamine/1,3-diaminopropane, and the terminator was diethylamine.

To respective portions of the polymer, bis[2-(4-chlorophenylureylene)ethyl] fumarate (Example 1) was added at 2.5 and 5 percent concentration levels based on the total solids content of the polymer.

The samples, along with a control sample, were spun as in Example 14, with the following results:

| Stabilizer | Stabilizer conc. (percent) | Gas fade (total change) | Fade index (change/hour) | Chlorine bleach (total change) |
|---|---|---|---|---|
| Control (no urea additive) | | 21.7 | 2.17 | 18.3 |
| Bis[2-(4-chlorophenylureylene) ethyl] fumarate | 2.5 | 20.3 | 2.37 | 10.5 |
| Do | 5.0 | 17.0 | 2.46 | 10.5 |

The observed values show that this substituted urea has little effect on ultraviolet stability (Fade Index) at either 2.5 or 5.0 percent levels in the absence of Tinuvin 327, thereby indicating a synergistic effect. Excellent stabilization is afforded at either concentration level to the action of chlorine bleach and at the 5.0 percent level to gas fade.

EXAMPLE 16

Evaluation of substituted ureas as color stabilizers in polyether polyol urethane polymer A urethane polymer was prepared in the same manner described in Example 15, except that "Polymeg 1500" (a Quaker Oats Co. polyether polyol of 1500 molecular weight) was used to replace the lactone diol blend of Example 15. The polymer, as used, contained 0.5 percent TiO$_2$, 1.0 percent Tinuvin 327, and 0.5 percent AO–431.

To respective portions of the polymer, bis[2-(4-chlorophenylureylene)ethyl] fumarate was added at 2.5 and 5.0 percent concentration levels (percent based on total solids). The samples, along with a control sample, were spun as in Example 14 with the following results:

| Stabilizer | Stabilizer conc. (percent) | Gas fade (total change) | Fade Index (change/hour) | Chlorine bleach (total change) |
|---|---|---|---|---|
| Control (no urea additive) | 0 | 19.5 | 0.32 | 12.8 |
| Bis[2-(4-chlorophenylureylene)-ethyl] fumarate | 2.5 | 19.2 | 0.26 | 14.4 |
| Do | 5.0 | 14.9 | 0.35 | 14.2 |

The observed values indicate that the evaluated substituted urea has little effect on ultraviolet and chlorine bleach stability even at 5.0 percent concentration, little effect on gas fade at the 2.5 percent level, but significant effect on gas fade at the 5.0 percent level.

EXAMPLE 17

Evaluation of substituted ureas as color stabilizers in film cast from urethane polymers To respective portions of a polymer solution prepared as in Example 15, and containing 4.0 weight percent TiO$_2$, 1.0 weight percent Tinuvin 327, and 0.5 weight percent AO–431, 1-octadecyl-3-(4-chlorophenyl) urea and 1-octadecyl-3-(2-chlorobenzyl) urea (cf. Examples 12 and 13) were incorporated at 2.5 and 5.0 weight percent concentration levels (all percentages based on polymer total solids). Films were cast of the respective samples (along with a control sample), and cured at 90° C. for about 20 hours. After curing, the films were about 0.010 inch in thickness. Color evaluation data of the cast films were as follows:

| Stabilizer | Stabilizer conc. (percent) | Gas fade (total change) | Fade Index (change/ hour) | Chlorine bleach (total change) |
|---|---|---|---|---|
| Control (no urea additive) | | 2.8 | 0.385 | 2.1 |
| 1-octadecyl-3-(4-chlorophenyl) urea | 2.5 | 1.15 | 0.500 | 0.75 |
| Do | 5.0 | 0.45 | 0.430 | 0.05 |
| 1-octadecyl-3-(2-chlorobenzyl) urea | 2.5 | 0.30 | 0.328 | 2.65 |
| Do | 5.0 | 0.05 | 0.408 | 1.7 |

The observed values show that these ureas have little effect on ultraviolet (Fade Index) stability in cast films at either concentration level, but are particularly effective on gas fade and chlorine bleach stabilities at the 5.0 percent level. While the indices for gas fade and chlorine bleach are numerically low, the percentage improvement is highly significant. These low indices are common with films containing a high concentration (4.0 percent) of $TiO_2$.

EXAMPLE 18

Evaluation of substituted ureas as color stabilizers for urethane polymers at differing concentration levels To respective portions of polymer prepared as in Example 15, and containing 4.0 weight percent $TiO_2$, 1.0 weight percent Tinuvin 327, and 0.5 weight percent AO–431 (based on total solids), bis[2-(4-chlorophenylureylene)ethyl] fumarate was incorporated on 2.5 and 5.0 weight percent concentration levels. The samples, along with a control sample, were wet-spun to give fibers with the following properties:

| Stabilizer | Stabilizer conc. (percent) | Gas fade (total change) | Fade Index (change/ hour) | Chlorine bleach (total change) |
|---|---|---|---|---|
| Control (no urea additive) | | 12.8 | 0.38 | 6.4 |
| Bis[2-(4-chlorophenylureylene)-ethyl] fumarate | 2.5 | 12.1 | 0.28 | 6.0 |
| Do | 5.0 | 6.8 | 0.23 | 3.2 |

In a similar manner, bis[2-(4-chlorophenylureylene)-ethyl] fumarate was added at 2.5 and 5.0 weight percent concentrations to respective portions of the same urethane polymer containing 0.5 weight $TiO_2$, weight percent Tinuvin 327, and 0.5 weight percent AO–431. These samples, with a control, were wet-spun to give fibers that had the following color properties:

| Stabilizer | Stabilizer conc. (percent) | Gas fade (total change) | Fade Index (change/ hour) | Chlorine bleach (total change) |
|---|---|---|---|---|
| Control (no urea additive) | | 15.7 | 0.46 | 5.7 |
| Bis[2-(4-chlorophenylureylene)ethyl] fumarate | 2.5 | 14.5 | 0.43 | 6.2 |
| Do | 5.0 | 9.0 | 0.31 | 2.2 |

The observed values show that the substituted ureas at 2.5 percent level have only moderate activity as color stabilizers on this polymer containing either 4.0 or 0.5 percent $TiO_2$. However, the stabilizing effects at the higher concentration (5.0 percent) are highly significant on the polymer at either $TiO_2$ level.

EXAMPLE 19

Effect of substituted urea stabilizers on tensile properties of processed elastomers To respective portions of polymer prepared as in Example 15 and containing 4.0 weight percent $TiO_2$, 1.0 weight percent Tinuvin 326,[1] and 0.5 weight percent AO–431 (based on polymer total solids), substituted ureas (as listed in the following table) were incorporated on a 5.0 weight percent level (based on total polymer solids). The samples, along with a control sample, were wet-spun and the straight break tensile properties of the resultant fibers were obtained.

| Stabilizer | Stabilizer conc. (percent) | Tenacity (g.p.d.) | Elongation (percent) | 300% modulus (g.p.d.) |
|---|---|---|---|---|
| Control (no urea additive) | | 0.915 | 550 | 0.228 |
| Bis[2-(2-chlorophenylureylene)-ethyl] fumarate | 5.0 | 0.850 | 570 | 0.236 |
| Bis[2-(3-chlorophenylureylene)-ethyl] fumarate | 5.0 | 0.886 | 580 | 0.220 |
| Bis[2-(4-chlorophenylureylene)-ethyl] fumarate | 5.0 | 0.895 | 580 | 0.210 |
| Bis[2-(2-chlorobenzylureylene)-ethyl]-fumarate | 5.0 | 0.860 | 540 | 0.275 |
| Bis[2-(3,4-dichlorophenylureylene)-ethyl] fumarate | 5.0 | 0.878 | 580 | 0.224 |

The observed values indicate that the incorporation of effective concentrations of substituted urea color stabilizers has essentially no effect on the tensile properties of the processed polyurethane elastomer. The minor differences, both positive and negative, are well within the accuracy of the testing procedures.

EXAMPLE 20

A variety of substituted ureas produced by reacting various amines with FDI were incorporated in the elastic urethane fiber of Example 15. The proportion of urea additive was 5 weight percent, based on polymer weight. The fibers also contained 4 weight percent titanium dioxide, 1 weight percent Tinuvin 326, and 0.5 weight percent AO–431.

The table below displays the example number of the substituted urea additive, and the results of gas fade, Fade Index, and chlorine bleach evaluations.

| Example No. of urea | Gas fade (total change) | Fade Index (change/ hr.) | Chlorine bleach (total change) |
|---|---|---|---|
| Control (no urea additive) | 11.9 | 0.30 | 13.2 |
| 2 | 6.3 | 0.22 | 9.1 |
| 4 | 3.8 | 0.16 | 5.8 |
| 1 | 4.5 | 0.21 | 4.8 |
| 8 | 5.1 | 0.15 | 4.7 |
| 10 | 9.1 | 0.15 | 6.7 |
| 7 | 6.6 | 0.21 | 5.5 |
| 9 | 7.8 | 0.25 | 8.7 |
| 11 | 4.9 | 0.20 | 8.6 |

EXAMPLE 21

Two ureas that were produced by reacting 2-chloroaniline with FDI or 1,6-hexamethylene diisocyanate were incorporated in the elastic urethane fiber of Example 15. The proportion of urea additive was 5 weight percent in each case (based on weight of polymer). The fibers also contained 4 weight percent $TiO_2$, 1 percent Tinuvin 326, and 0.5 percent AO–431, percentages being based on polymer weight.

The table below displays the example number of the substituted urea additive, and the results of gas fade, Fade Index, and chlorine bleach evaluations.

| Example No. of urea | Gas fade (total change) | Fade Index (change/ hr.) | Chlorine bleach (total change) |
|---|---|---|---|
| Control (no urea additive) | 12.5 | 0.43 | 2.9 |
| 2 | 8.1 | 0.30 | 2.7 |
| 3 | 9.9 | 0.35 | 3.9 |

[1] Same as Tinuvin 327 except that one of the two R groups is methyl instead of t-butyl.

EXAMPLE 22

Two substituted ureas that were produced by reacting FDI with either ortho-toluidine or 2-methoxyaniline were incorporated in the elastic urethane fiber of Example 15. The proportion of urea additive was 5 weight percent in each case (based on polymer weight). The fibers also contained 4 weight percent $TiO_2$, 1 weight percent Tinuvin 326, and 0.5 weight percent of AO-431, the percentages being based on polymer weight.

The table below displays the example number of the urea additive, and the results of the gas fade, Fade Index, and chlorine bleach evaluations.

| Example No. of urea | Gas fade (total change) | Fade Index (change/hr.) | Chlorine bleach (total change) |
|---|---|---|---|
| Control (no urea additive) | 15.8 | 0.53 | 5.7 |
| 5 | 11.4 | 0.32 | 2.6 |
| 6 | 13.0 | 0.27 | 3.4 |

The foregoing examples have illustrated the value of the present invention in enhancing the known utility of urethane polymers by improving the resistance of such polymers to discoloration from various causes.

What is claimed is:

1. A urethane polymer product stabilized against discoloration, having admixed therein a stabilizing proportion of a substituted urea selected from compounds of the formulas:

(I) 

and (II) 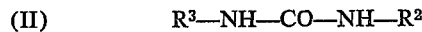

wherein $R^1$ represents alkylene or cycloalkylene of from 6 to 24 carbon atoms, di(ethylene)fumarate, or di(1-methylene) fumarate; wherein $R^2$ represents chlorophenyl, methoxyphenyl, methylphenyl, benzyl, 2-bromophenyl, 2-chlorobenzyl, 3,4-dichlorophenyl, or 2,4,5-trichlorophenyl; and wherein $R^3$ represents alkyl of from 12 to 24 carbon atoms.

2. The urethane polymer product of claim 1 wherein the substituted urea stabilizer is present in an amount of from about 1 to about 10 weight percent, based on weight of urethane polymer.

3. The urethane polymer product of claim 1 wherein the substituted urea stabilizer is employed in an amount of from about 2.5 to about 5 weight percent, based on weight of urethane polymer.

4. The urethane polymer product of claim 1 wherein said product is in the form of a film.

5. The urethane polymer product of claim 1 wherein said product is in the form of an elastic fiber.

6. The urethane polymer product of claim 5 wherein the elastic fiber is a polyurethane-urea based upon a polyacetone diol.

7. The urethane polymer product of claim 5 wherein the substituted urea stabilizer employed is a compound of Formula I wherein $R^1$ is di(ethylene) fumarate.

8. The urethane polymer product of claim 5 wherein the substituted urea stabilizer employed is a compound of Formula I or II wherein $R^2$ is chlorophenyl.

9. The urethane polymer product of claim 5 wherein the substituted urea stabilizer is a compound selected from the group consisting of:
bis[2-(4-chlorophenylureylene)ethyl] fumarate;
bis[2-(2-chlorophenylureylene)ethyl] fumarate;
bis[2-(3-chlorophenylureylene)ethyl] fumarate;
bis[2-(3,4-dichlorophenylureylene)ethyl] fumarate;
bis[2-(2,4,5-trichlorophenylureylene)ethyl] fumarate;
bis[2-(2-bromophenylureylene)ethyl] fumarate; and
bis[2-(2-chlorobenzylureylene)ethyl] fumarate.

References Cited
UNITED STATES PATENTS

| | | | |
|---|---|---|---|
| 3,427,346 | 2/1969 | Brotherton et al. | 260—485 |
| 2,651,620 | 9/1953 | Hill et al. | 260—553 |
| 3,352,822 | 11/1967 | Yamadera et al. | 260—45.85 |
| 3,431,289 | 3/1969 | Freund et al. | 260—553 |
| 2,781,330 | 2/1957 | Downey | 260—553 |
| 3,288,851 | 11/1966 | Martin et al. | 260—553 |
| 3,342,773 | 9/1967 | Mirviss et al. | 260—45.85 |
| 3,388,158 | 6/1968 | Surrey | 260—553 |
| 3,394,104 | 7/1968 | Hotten | 260—45.9 |
| 3,577,383 | 5/1971 | Sedgwick | 260—45.9 |
| 3,351,608 | 11/1967 | Oertel et al. | 260—45.9 |

DONALD E. CZAJA, Primary Examiner

V. P. HOKE, Assistant Examiner

U.S. Cl. X.R.

260—2.5 BB, 45.9 R, 485 H, 485 J, 553 A

PO-1050
(5/69)

UNITED STATES PATENT OFFICE
CERTIFICATE OF CORRECTION

Patent No. 3,663,506      Dated May 16, 1972

Inventor(s) Robert J. Knopf, et al.

It is certified that error appears in the above-identified patent and that said Letters Patent are hereby corrected as shown below:

Claim 1, third line after Formula (II), (Column 9, lines 36-37) "(1-methylene)" should read --(1-methylethylene)--.

Claim 6, last line, "acetone" should read --lactone--.

Signed and sealed this 29th day of May 1973.

(SEAL)
Attest:

EDWARD M. FLETCHER, JR.　　　　　ROBERT GOTTSCHALK
Attesting Officer　　　　　　　　Commissioner of Patents